United States Patent

Rupnick

[15] 3,635,347
[45] Jan. 18, 1972

[54] APPARATUS FOR CONTROLLING THE DISPERSION OF POLLUTANTS FLOATING ON A BODY OF WATER

[72] Inventor: Edward J. Rupnick, 1501 Lincoln Ave., N.E., Renton, Wash. 98055

[22] Filed: Aug. 15, 1969

[21] Appl. No.: 850,420

[52] U.S. Cl. .................................................. 210/242
[51] Int. Cl. ................................................. C02b 9/02
[58] Field of Search ............... 210/83, 242, 523, DIG. 21; 61/1; 263/33; 137/344

[56] References Cited

UNITED STATES PATENTS

| 2,783,970 | 3/1957 | Gillespie | 263/33 |
| 3,389,559 | 6/1968 | Logan | 61/1 |
| 3,469,402 | 9/1969 | Lowd | 61/1 |
| 3,476,246 | 11/1969 | Dahan | 210/83 |
| 3,500,841 | 3/1970 | Logan | 137/13 |

FOREIGN PATENTS OR APPLICATIONS 945,091  12/1963  Great Britain ................. 210/DIG. 21

Primary Examiner—Reuben Friedman
Assistant Examiner—T. A. Granger
Attorney—Seed, Berry & Dowrey

[57] ABSTRACT

Dispersion of pollutants having specific gravities less than that of water and floating on a body of water are controlled by encircling the pollutant body with a floating reservoir wall having an open top and open bottom. The reservoir wall comprises an elongated length of flexible water-impervious material having disposed along its upper end a plurality of inflatable flotation cells inflatable through a common duct running the length thereof and having disposed along its lower end ballast means for maintaining the lower end of the wall beneath the surface of the pollutant and body of water. The ends of the reservoir wall are joined together in sealing relationship by compressively engaging inflated cells disposed along the ends of the reservoir wall. Pollutants issuing into a body of water can be directed into the interior of the enclosed reservoir formed by the reservoir wall by a flexible or inflexible conduit secured at one end around the source of pollution with the opposite end leading to the interior of the reservoir. The reservoir wall is held in a predetermined location by means of anchors resting on the floor of the body of water and connected by lead lines to the lower end of the reservoir wall.

10 Claims, 6 Drawing Figures

PATENTED JAN 18 1972

INVENTOR.
EDWARD J. RUPNICK

BY
ATTORNEYS

PATENTED JAN 18 1972
3,635,347
SHEET 2 OF 2
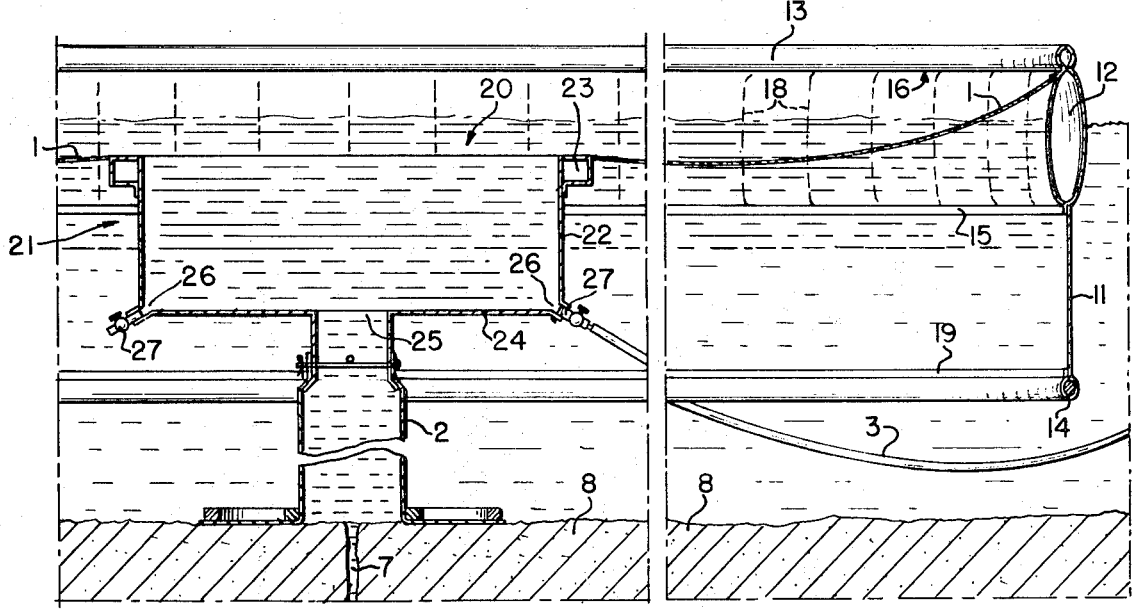
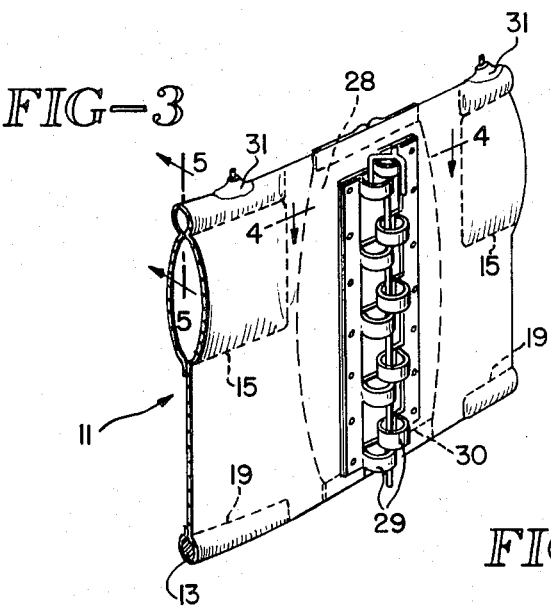
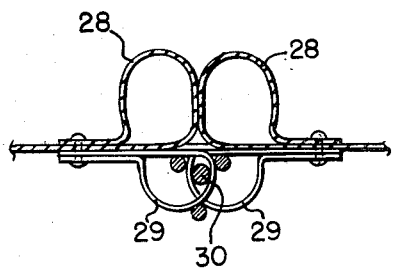
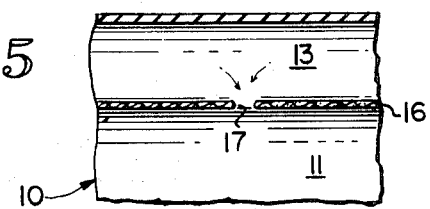
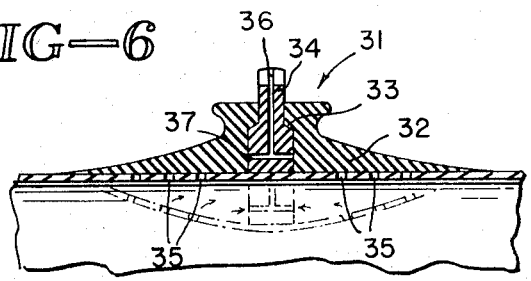
INVENTOR.
EDWARD J. RUPNICK
BY Seed, Berry & Downey
ATTORNEYS

3,635,347

APPARATUS FOR CONTROLLING THE DISPERSION OF POLLUTANTS FLOATING ON A BODY OF WATER

BACKGROUND OF THE INVENTION

1. Field of the Invention

This invention relates to apparatus for collecting and preventing dispersion of pollutants having a specific gravity less than that of water.

2. Prior Art Relating to the Disclosure

In recent years pollution of the world's waterways (oceans, lakes, rivers, streams, etc.) has received much attention. Many of the world's beaches have been coated with crude oil floating on the surface of the ocean and driven against the coastline by tidal action, the crude oil seeping from oil tankers or from off-shore drilling locations. Control of the discharge of crude oil or other pollutants which float on the surface of a body of water and which issue from oceangoing vessels, industrial complexes, municipalities, etc., has remained a problem. Although many ways of controlling the spread of pollutants of this type have been advocated very few have been adopted because of the high costs involved.

Reference is made to U.S. Pat. No. 2,783,970 wherein an open top and bottom reservoir is located on the surface of a body of water for storing and transferring oil delivered to it from underwater locations. No reference is made concerning control of pollution nor is there any description of the reservoir system used.

SUMMARY OF THE INVENTION

This invention relates to apparatus for collecting and controlling the dispersion of pollutants issuing into a body of water and floating on the surface of a body of water. The pollutants are directed into an enclosed reservoir by means of a conduit secured at one end around the source of pollution and at the other end to the interior of the enclosed reservoir. The pollutant is preferably directed into a floating inner reservoir having a bottom wall and sidewalls, along the upper length of the sidewalls of which are disposed flotation cells. Surrounding the inner reservoir is an outer reservoir comprised of a flexible reservoir wall of water-impervious material adapted to float on the surface of a body of water in a substantially vertical position, the barrier wall having flotation cells disposed along the upper length thereof inflatable through a common filler duct. Ballast means are disposed along the lower length of the reservoir wall to stabilize the wall and maintain the lower portion of the wall beneath the surface of the body of water and pollutant body a predetermined distance. The ends of the reservoir wall are provided with means for sealing the respective ends thereof together to form a reservoir enclosure.

The primary object of the invention is to provide a method for controlling dispersion of liquid pollutants having a specific gravity less than that of water by confinement in one or more floating reservoir systems, the reservoir systems comprising an inner floating enclosed reservoir having a bottom wall, sidewalls, and an inlet into which the pollutant is directed, and an outer floating reservoir having an open top and an open bottom for confining the overflow of pollutant from the inner reservoir.

It is a further object of this invention to provide an apparatus for collecting and confining pollutants floating on The surface of a body of water within a reservoir, the reservoir comprising a reservoir wall having a plurality of flotation cells along the upper length thereof inflatable through a common filler duct.

It is a further object of this invention to provide a reservoir for creating an enclosed reservoir to confine pollutants wherein the ends of the reservoir wall can be joined together in sealing relation in a simple manner.

It is still a further object of this invention to provide an easy to manufacture, inexpensive means of confining pollutants floating on the surface of a body of water.

BRIEF DESCRIPTION OF THE DRAWINGS

FIG. 2 is a partial sectional view along section line 2—2 of FIG. 1 illustrating details of construction of the floating inner and outer reservoirs;

FIG. 3 is a partial perspective view of the means of sealing and closing the respective ends of the barrier wall together;

FIG. 4 is a sectional view along section line 4—4 of FIG. 3;

FIG. 5 is a sectional view along section line 5—5 of FIG. 3 illustrating the manner in which the flotation cells are filled through a common filler duct; and FIG. 6 is a cross-sectional view of an inflation/deflation value.

DETAILED DESCRIPTION OF THE INVENTION

Figure 1:
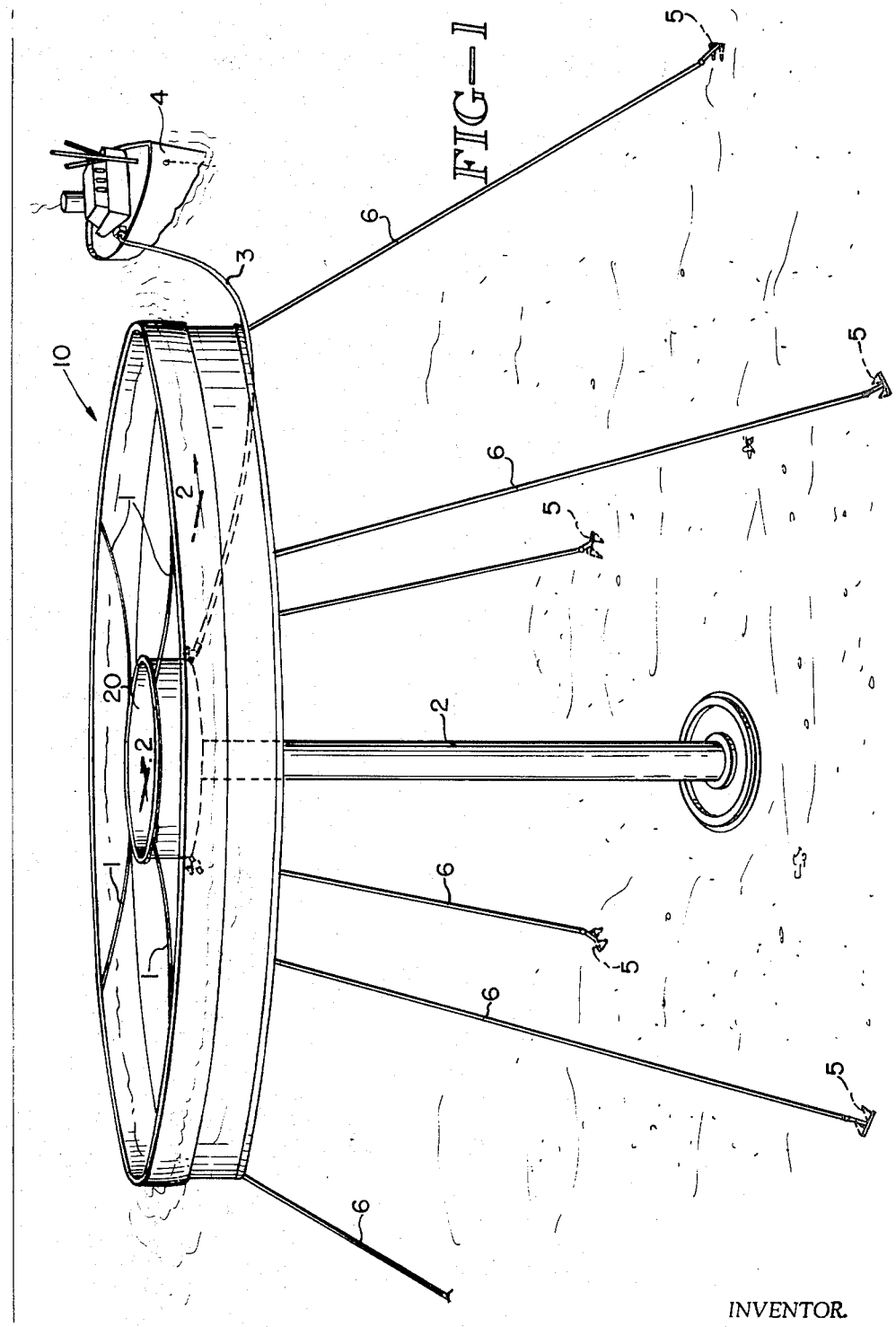
FIG. 1 is a perspective view illustrating the overall apparatus for confining and preventing dispersion of a pollutant issuing from the floor of a body of water.

FIG. 1 illustrates an overall view of the apparatus of this invention and includes an outer reservoir 10, and an inner reservoir 20 supported in spaced relation from the outer reservoir by guy wires on lines 1. Leading from the source of pollution to the interior of inner reservoir 20 is a conduit 2 which directs the pollutant from its discharge point into the interior of inner reservoir 20. An outlet duct or ducts in inner reservoir 20 connect to line 3 leading to a transport, tanker or other vessel 4 for removing the pollutants as necessary from the reservoir system. A series of anchors 5 having guy wires 6 leading to the lower end of the outer reservoir wall are positioned at predetermined intervals around the periphery of the outer reservoir wall to hold the inner and outer reservoirs 10 and 20 in a predetermined location.

In more detail the outer reservoir wall of reservoir 10 is made of a flexible water-impervious material. Materials which may be used include rubber, polyethylene film, polypropylene film, or other suitable synthetic materials. Typically a heavy gauge material which will not easily puncture and does not become brittle after extended periods of use is preferred. The outer reservoir wall has a series of flotation cells 12 disposed along the upper length dimension thereof, the flotation cells inflatable with air or other gas through a common filler duct 13. Ballast means 14 are attached to the end of the reservoir wall 11 opposite the flotation cells to stabilize the reservoir wall in a vertical position and maintain the lower portion of the reservoir wall beneath the surface of the body of water and pollutant. The ballast 14 may be a series of weights about which the lower portion of reservoir wall 11 is enclosed and seamed or may be a series of weights clipped through reinforced eyelets in the lower edge of reservoir 11. Any number of ways of attaching the ballast to the lower edge of the reservoir wall are possible.

The reservoir wall 11 is preferably formed from a unitary, elongated sheet of material. The flotation cells are formed by folding the top edge of the material back on itself and joining it to itself along the lower seam 15. If the material used is heat sealable the seam may be formed by suitable heat sealing means. The seam may also be stitched or formed in other ways. The lower seam 15 is formed at a point preferably above the center line of the finished reservoir wall. The folded-over reservoir wall is then joined to itself above seam 15 at discontinuous intervals by seam 16 running parallel to seam 15. Seam 16 separates the flotation cells 12 from the common filler duct 13 communicating with the flotation cells 12 through openings 17 in seam 16 as shown in detail in FIG. 5. Interconnecting seams 15 and 16 are a series of seams 18 separating the flotation cell 12 into a plurality of smaller flotation cells, thereby minimizing loss of buoyancy of the reservoir wall when and if an individual flotation cell is damaged and helping to hold the flotation portion of the wall erect.

The lower edge of reservoir wall 11 is folded back on itself and seamed along substantially line 19 parallel to seam 15 to form a small opening into which ballast material 14 may be inserted, the ballast material serving to hold the lower edge of the reservoir wall beneath the surface of the body of water and pollutant a predetermined distance.

Although seams 18 interconnecting lower seam 15 and upper seam 16 are shown as being a series of vertical seam lines, it is obvious that other means of separating the flotation cells into smaller units may be used.

The inner reservoir wall 21 may be made of a similar material as that of reservoir wall 11 or it may be made of a substantially rigid material. The inner reservoir wall 21 comprises sidewalls 22 having one of more flotation cells 23 disposed around the upper surface thereof and bottom wall 24 interconnecting sidewalls 22. An inlet duct 25, preferably in the bottom wall of the inner reservoir, serves as an inlet duct for the pollutant. The bottom of sidewalls of the inner reservoir may have one or more openings 26 serving as outlet ducts for the pollutant. To the openings 26 are secured valves 27 connected to one or more conduit lines 3 leading to a tanker or other storage vessel.

Pollutants entering the inner reservoir 20 fill the reservoir and overflow into reservoir 10. As the pollutants typically have a specific gravity less than that of water they float on the surface thereof and are confined within the limits of reservoir 10.

Although the reservoir walls 11 and 21 of reservoirs 10 and 20 can be made in the form of endless elongated strips it is desirable to be able to separate the reservoir walls into one or more sections which can be joined together in sealing relationship. Means for sealing and joining the ends of one or more sections of reservoir wall together are show in FIGS. 3 and 4. Inflatable sealing cells 28 are formed on the respective ends of a length of reservoir wall by folding the end portion of the sheet material back on itself and stitching it or otherwise securing it to the sheet material to form an inflatable cell. Other means of forming inflatable cells on the respective ends of the reservoir wall may be used. Opposite each of the respective inflatable cells 28 are riveted or otherwise attached to the reservoir wall a series of loops 29 of metal, plastic or equivalent material which are adapted to interconnnect with each other. To close and seal a section of reservoir wall the respective ends of the reservoir wall are brought together, the loops 29 overlapped and a locking pin 38 inserted therethrough as shown in FIG. 3 and 4. The length of loops 29 is made such that the inflatable cells 28 on he respective ends of the reservoir wall sections compressively engage each other in sealing relationship when the loops are interconnected, to the extent that they prevent flow of pollutants from the interior of the reservoir out through the reservoir wall. Locking pin 30 may be made in any number of configurations. The pin shown comprises a central rod extending through all of the interconnecting loops 29 with three spaced apart dull point prongs at one end thereof adapted to lock the ends of the respective reservoir wall sections in place and prevent their coming apart.

The inner reservoir 20 is positioned within outer reservoir 10, the inner reservoir wall 21 held in spaced relation from reservoir wall 11 by a series of guy wires 1 as shown in FIG. 1. The outer reservoir wall 11 is held in place above the source of pollution by a series of anchors 5 resting on the ocean floor and secured to the bottom edge of reservoir wall 11 at spaced intervals by guy wires. Other means of anchoring the reservoir wall in place may be used including the use of sea anchors.

Spaced at regular or irregular intervals along filler duct 13 and sealing cells 28 are valves 31 (see FIGS. 3 and 6) for inflation and deflation of the inflatable buoyancy cells 12 and sealing cells 28. The valve, shown in detail in FIG. 6, includes a rigid or flexible body 32 secured to the wall of the filler duct 13 by an adhesive, heat sealing or otherwise, the body 32 having a central opening 33 adapted to receive a stem 34. Small openings 35 are made in the walls of filler duct 13 or sealing cells to allow air or other gas used to inflate the cells to flow into and out of the cells. Stem 34 is an elongated member which compressively engages the walls of opening 33, the member tapering to smaller diameter so that air pressure in the cells cannot force the stem out of the opening 33. Stem 34 has a central aperture 36 running the length thereof, the aperture 36 intersecting with a transverse aperture 37 near the lower end thereof running the width of the stem and two shots near the top end running the width of the stem. Air or other gas is pumped into cells through aperture 36 in the stem, the air pressure distending the portion of the wall of the filler duct or inflatable cell as shown in phantom, allowing the gas to flow through openings 35 into the inflatable cells. As soon as the air pressure on the wall portion is terminated the internal air pressure in the inflatable cells and filling duct forces the wall portion against the valve body 32, preventing overflow of any air. To deflate the cells, stem 34 is pressed inwardly to distend the wall portion beneath the valve body a sufficient amount to allow the air to flow out through openings 35 in the wall portion, apertures 36 and 37 of the stem 34 into the atmosphere.

Conduit 2 interconnecting the source of pollution and inner reservoir 20 may be made of flexible or rigid material or a combination of both. One end of conduit 2 is secured around the source of pollution. As shown in FIGS. 1 and 2, the source of pollution is a fissure 7 in the floor 8 of a body of water over which the conduit 2 is positioned. The conduit is held in place over the fissure or opening by suitable anchor means such as heavy weights, spikes, etc. The conduit 2 may also be secured to a source of pollution issuing from a split pipe, from the end of the pipe or from a fissure of any type. The upper end of conduit 2 is secured over sleeve 25 of the inner reservoir 20 communicating with the interior of inner reservoir 20. The conduit 2 may be secured to sleeve 25 in any suitable manner.

The overall reservoir system, comprising the outer reservoir 10 and inner reservoir 20 will contain a predetermined amount of pollutant material depending on the size of the reservoirs. Necessarily an amount of pollutant equal to at least that being added by the source of pollution must be periodically or continuously removed from he reservoir system to prevent overflow. The pollutant is withdrawn from inner reservoir 20 used as a sump, through opening 26, valve 27 and conduit 3 to a suitable storage location or container from which it can be transported away from the area. One or more conduits leading from the inner reservoir 20 may be needed and can be provided.

As shown in FIG. 2 the top in inner reservoir 20 is preferably floated below the top of outer reservoir 10 so that the pollutant, when being pumped out of the inner reservoir to a suitable storage or processing location, will flow from the outer reservoir into the inner reservoir.

If pollutants have been inadvertently spilled or have issued into a body of water and are floating on the top thereof the pollutants can be contained by using sections of the outer reservoir wall like a fishnet. One end of the reservoir wall can be anchored by suitable anchors or by an anchor vessel and a towing vessel connected to the opposite end to draw the reservoir wall around the surface-borne pollutant to collect them together. Once collected, the respective ends of the reservoir wall are joined together to create a closed reservoir confining the pollutants in a nondispersible form.

If it is desired to move the collected pollutants to a different location the anchors holding the reservoir wall can be removed and the reservoir wall towed to a different location.

The inner reservoir 20 serves as a sump to empty the outer reservoir 10. For this reason outlet ports 26 communicating with conduit 3 leading to a suitable container or storage vessel are provided. It is not necessary, however, to utilize an inner reservoir 20 in all cases as the pollutant can be drawn from the interior of outer reservoir 10 through suitable conduits.

The reservoir wall of this invention can be fabricated into sections of predetermined lengths with the ends thereof having suitable closures such as described previously and shown in FIGS. 3 and 4, so that one or more sections can be joined together to form desired lengths of reservoir wall.

The embodiments of the invention in which an exclusive property or privilege is claimed are defined as follows:

1. Apparatus for collecting and confining pollutants floating on the surface of a body of water comprising;

buoyant means having an open top and bottom encircling the pollutant body and creating a reservoir surrounding the pollutant body, the buoyant means comprising an elongated, flexible, floating reservoir wall of water-impervious material adapted to float on the surface of the water in a substantially vertical position, the reservoir wall having flotation cells disposed along the upper length of the reservoir wall, and ballast means disposed along the lower length of the reservoir wall to maintain the lower portion of the reservoir wall beneath the surface of the body of water and pollutant a predetermined distance, means for sealing and joining the ends of the reservoir wall together including inflatable sealing cells disposed substantially vertically along each of the ends of the reservoir wall, interconnecting loops secured to each end of the reservoir wall and a locking pin locking the respective loops of each end of the reservoir wall in interconnecting relationship, the inflatable sealing cells adapted to compressively engage each other in sealing relationship on interconnection of the loops with the locking pin.

2. The apparatus of claim 1 including anchor means attached to the lower edge of the reservoir wall for anchoring the reservoir wall in a predetermined location.

3. The apparatus of claim 1 including conduit means conveying the pollutant from its discharge point to the interior of the reservoir.

4. The apparatus of claim 3 including a smaller floating inner reservoir sump disposed within the reservoir, the inner reservoir comprising a bottom wall, a sidewall having flotation cells disposed along the upper end thereof, and opening into the interior of the inner reservoir communicating with said conduit means, and means communicating with the interior of the inner reservoir for removing said pollutant to a storage or processing location.

5. The apparatus of claim 1 wherein a plurality of flotation cells inflatable through a common filler duct run the length direction of the reservoir wall.

6. The apparatus according to claim 5 wherein the reservoir wall constitutes a sheet of water impervious material wherein a portion of the material along the upper length direction thereof is folded over and joined to itself to form a lower seam running substantially the length of the wall, wherein the material is joined to itself at discontinuous intervals above the lower seam to form a discontinuous seam substantially parallel to the lower seam, and wherein a plurality of interconnecting seams connect the lower and upper seams at spaced intervals to form a plurality of flotation cells between the upper and lower seams, each of the flotation cells being in fluid communication with the filler duct through openings in the discontinuous seam.

7. The apparatus of claim 3 wherein said anchoring means comprises a series of anchors resting on the floor of the body of water connected with guy wires to said reservoir wall at predetermined intervals.

8. The apparatus of claim 1 including valve means in fluid communication with the interior of the inflatable sealing cells and flotation cells for inflation and deflation thereof.

9. The apparatus of claim 8 wherein the valve means includes a valve body secured around its periphery to the walls of the inflatable sealing and flotation cells, the valve body having an opening therethrough for receiving a value stem, a valve stem in said opening having a first aperture running the length thereof, a second transverse aperture running the width thereof, intersecting the first aperture near the lower end thereof, and two transverse slots near the top end thereof, and openings in the walls of the inflatable sealing and flotation cells beneath the valve body, the openings not being in fluid communication with the apertures in the valve stem except on inflation and deflation.

10. An apparatus for collecting and holding pollutants floating on the surface of the body of water, comprising:

1. an outer reservoir having an open top and bottom and including an elongate flexible, floating reservoir wall of water impervious material adapted to float on the surface of a body of water in a substantially vertical position, the reservoir wall having a plurality of flotation cells disposed along the upper length thereof inflatable through a common filler duct, ballast means disposed along the lower length thereof to maintain the lower portion of the reservoir wall beneath the surface of the body of water and pollutant a predetermined distance, and means for sealing and joining the respective ends of the reservoir wall together to form an enclosed area, including inflatable sealing cells disposed substantially vertically along each of the ends of the reservoir wall, interconnecting loops secured to each end of the reservoir wall and a locking pin locking the respective loop of each end of the reservoir wall in interconnecting relationship, the inflatable sealing cells adapted to compressively engage each other in sealing relationship on interconnection of the loops with the locking pin;

2. an inner reservoir within and spaced from the outer reservoir, the inner reservoir including a bottom wall, substantially vertical sidewalls joining the bottom wall and having flotation cells disposed along the upper length; and 3. conduit means conveying the pollutants from their discharge point to the inner reservoir, the conduit means connected at one end to the source of pollution and at the other end to an opening in the inner reservoir.

* * * * *